United States Patent [19]

Malhotra

[11] Patent Number: 5,270,536
[45] Date of Patent: Dec. 14, 1993

[54] METHOD OF USING DC PHOTOCURRENT MEASUREMENTS TO SENSE WAVELENGTH OR COLOR OF LIGHT OR TO CHARACTERIZE SEMICONDUCTOR MATERIALS

[75] Inventor: Vinod Malhotra, Ewa Beach, Hi.

[73] Assignee: The University of Hawaii, Honolulu, Hi.

[21] Appl. No.: 960,785

[22] Filed: Oct. 13, 1992

[51] Int. Cl.$^5$ .............................................. G01J 3/50
[52] U.S. Cl. ...................................... 250/226; 257/53
[58] Field of Search .......................... 250/226, 227.11; 356/411, 432; 257/53

[56] References Cited

U.S. PATENT DOCUMENTS

| | | | |
|---|---|---|---|
| 4,749,851 | 6/1988 | Wolffenbuttel | 250/211 |
| 4,791,396 | 12/1988 | Nishizawa et al. | 257/258 |
| 5,140,397 | 8/1992 | Haga et al. | 257/53 |

OTHER PUBLICATIONS

M. Welling & V. Melhotra, "Novel Techniques of Sensing Wavelength and Color of Visible Light", proceedings of Electrochemical Society Meeting, Oct. 13–17, 1991, presented in Phoenix on Oct. 16, 1991, 6 pages in length.

M. Welling & V. Malhotra, "Color Detection Using Amorphous Silicon Schottky Photodiode", *Sensors and Actuators A*, 29 (1991), publisher: Elsevier Sequoia, Lausanne, 6 pages in length (pp. 195–200).

V. Malhotra & M. Weling, "A Novel Technique for Characterization of Amorphous Silicon Thin Films," Materials Research Society Meeting (Apr. 27–May 1, 1992 in San Francisco, Calif.), presented Apr. 30, 1992, 6 pages in length.

R. F. Wolffenbuttel article, "Photodiodes in Silicon With an Intrinic Colour Filtering Capability," *Transducers*, from Delft Univ. of Technology, Dept. of Electrical Engineering (1987), pp. 219–222.

R. F. Wolffenbuttel, "Color Filters Integrated with the Detector in Silicon", *IEEE Electron Device Letters*, vol. EDL-8, No. 1, Jan. 1987, pp. 13–15.

R. F. Wolffenbuttel & G. De Graff, "Performance of an Integrated Silicon Colour Sensor with a Digital Output in Terms of Response to Colours in the Colour Triangle", *Sensors and Actuators*, A21-A23 (1990), pp. 574–580.

(List continued on next page.)

*Primary Examiner*—David C. Nelms
*Assistant Examiner*—T. Davenport
*Attorney, Agent, or Firm*—Limbach & Limbach

[57] ABSTRACT

A method of using measurements of the dc photocurrent produced by a photodetector to determine the wavelength or color of incident light, or to characterize certain properties of a semiconductor device or material. The intrinsic wavelength filtering ability of the photodetector is used as the basis for determining the wavelength of incident light by relating measurements of the dc photocurrent versus reverse bias voltage to the absorption coefficient of the semiconductor material from which the detector is fabricated. Color detection is accomplished by expressing the measured photocurrent as a linear combination of the photocurrents due to detection of each of the three primary colors. The coefficients of each of the terms of the linear combination are then varied to obtain the best fit to the measured photocurrent. This allows a determination of the color of the detected light based on the respective contributions of each of the primary colors to its actual color. The relationship between the absorption coefficient and wavelength can also be used to infer important characteristics of the semiconductor material from which the photodetector is fabricated. In this application of the method, monochromatic light of a known wavelength is used to illuminate the photodetector and measurements of the photocurrent versus reverse bias voltage are used to infer the value of the absorption coefficient corresponding to the wavelength of the light. These measurements can also be used infer the depletion width and doping density of the material.

13 Claims, 5 Drawing Sheets

OTHER PUBLICATIONS

P. L. P. Dillon, A. T. Brault, J. R. Horak, E. Garcia, T. W. Martin & W. A. Light, "Fabrication and Performance of Color Filter Arrays for Solid-State Imagers," *IEEE Transactions on Electron Devices*, vol. ED-25, No. 2, Feb. 1978, pp. 97-101.

T. Noda, A. Kouno & T. Ando, "An Economical Color-Television Camera Utilizing a Silicon Vidicon for Electronic Color Separation", *IEEE Transactions on Electron Devices*, vol. ED-22, No. 5, May 1975, pp. 248-251.

*Thesis* by M. G. Weling, submitted to Univ. of Hawaii, "Amorphous Silicon Color Sensors," dated Dec. 1990, Thesis Committee: V. Malhotra, J. W. Holm-Kennedy, K. Najita.

5,270,536

METHOD OF USING DC PHOTOCURRENT MEASUREMENTS TO SENSE WAVELENGTH OR COLOR OF LIGHT OR TO CHARACTERIZE SEMICONDUCTOR MATERIALS

TECHNICAL FIELD

The present invention is generally directed to techniques for sensing the color of light illuminating a detector, and more specifically, to a method for determining the wavelength or color of light incident on a photodetector, or for characterizing certain properties of semiconductor materials by measuring the dc photocurrent produced by a photodetector in response to its illumination by incident light.

BACKGROUND OF THE INVENTION

There are many situations in which information pertaining to the color or wavelength of light illuminating a detector is of interest. Color or wavelength sensing techniques are applicable to a variety of industries, ranging from agriculture to the design and fabrication of electronic components.

In the agricultural field, the degree to which fruit has ripened may be determined based on its color and can therefore be used to determine the optimal time for picking the fruit. Similarly, in industrial settings it is often desirable to sort objects based on their color. In this way color sensing capabilities may become important to the development of robotic vision systems and other disciplines where image processing is used to extract information.

Other applications of color or wavelength sensing include instances where it is desired to obtain spectrometric data, and situations where wavelength-multiplexing (as in optically based communication systems) may result in improvements to the information transfer capability of a system. Additional uses of color sensing techniques include quality inspection, detection of subtle changes in the color of stained cell and tissue samples for purposes of medical diagnosis, and process control during the deposition of thin films in the semiconductor industry.

The wavelength of light emitted by a source can be determined by using a monochromator/spectrometer and a suitable detector. A monochromator is essentially a box which contains a diffraction grating. The incoming light is diffracted through an angle which depends on its wavelength. This allows the wavelength to be inferred based on the location at which the light is detected. The instrument must be precisely aligned with the light source and the detector in order to operate properly. The disadvantage of such instruments is that they are bulky and expensive, and are not suited for use in environments where they would be subject to vibrations.

The conventional method for detecting color is somewhat different. Color, as perceived by the human eye, is based on the three primary colors, red, green, and blue. Other colors can be generated by mixing light of these wavelengths in varying proportions. Typically, color detection is performed by using three filters, one for each of the primary colors, and three photodetectors. The filters allow the transmission of one of the primary wavelengths, and the corresponding photodetector measures the intensity of the incident light at that wavelength. The responses of the photodetectors are then used to determine the relative contribution of each of the primary wavelengths to the incident light, and hence to infer its color. A drawback to such methods is that the use of three sensors with their corresponding filters can become complicated, and take up excessive space when forming a color sensing array.

In general terms, a practical color sensing system should be able to convert detected wavelength information into electrical signals which can be subjected to further processing. This can be accomplished in a variety of ways. One method is to use charge coupled devices (CCDs) which are arranged in an array and used with color-beam splitters. However, such systems are relatively expensive and bulky, which limits their usefulness for some applications.

Another method for detecting the color of incident light is based on using photodetectors equipped with polymer dye color-filters. A disadvantage of this type of sensor is that its fabrication cannot be easily integrated with conventional integrated circuit fabrication processes. Compatibility and ease of integration with conventional integrated circuit fabrication is desirable for at least two reasons. It allows the sensor to be fabricated on a semiconductor chip using well developed, existing processing technologies. This results in cost savings as the development of new process steps can be both time consuming and expensive. In addition, the sensor and its associated circuitry can then be fabricated on the same chip. This permits miniaturization and improves the reliability of the device.

To overcome the disadvantages of using multiple detectors, a single sensor capable of detecting multiple colors has been sought. Several candidate devices have been studied, including photodiodes formed in single-crystalline silicon and those formed in amorphous silicon. The operation of these devices is based on the intrinsic wavelength filtering property of silicon which results from the variation of the material's absorption coefficient with the wavelength of an illuminating photon. The absorption coefficient is the reciprocal of the penetration depth, which is a measure of the distance traversed by a photon into a material before it is absorbed by an electron.

If the total photocurrent produced by a detector in response to incident light is modeled as a linear combination of the photocurrent due to the detection of the three primary colors, then the problem becomes one of determining the incident photon flux $\phi$ which corresponds to each of the primary colors. This provides an indication of the relative contribution of each of the primary colors to the color of the incident light. The photon flux can be determined by making photocurrent measurements at three values of the reverse bias voltage, thereby forming a set of simultaneous linear equations. This set of equations can be expressed as:

$$J = qS\phi,$$

where J is a vector representing the three photocurrent components, q is the charge of an electron, $\phi$ is a vector representing the three flux components, and s is a matrix which characterizes the spectral response of the detector for the chosen values of the reverse bias voltage.

The S matrix can be independently determined by using monochromatic light of known intensity corresponding to the three primary colors, and measuring the photocurrent produced by the detector at the same three values of the reverse bias voltage. To determine the color of incident light, photocurrent measurements are made at the specified reverse bias voltages, giving the vector J. If the matrix equation for J is then solved for $\phi$, the color of the incident light can be determined from the relative contributions of the flux terms for the three primary colors.

Unfortunately, in order to solve the matrix equation and determine the flux terms, the matrix S must inverted. If the matrix is ill-conditioned with respect to finding its inverse, the solution for the flux terms may not be obtainable, or may be in error. This would produce an inaccurate result for the color of the incident light. This problem suggests that a more mathematically robust method for determining the color of incident light based on dc photocurrent measurements would be desireable.

A system for detecting color which uses a single photodetector and which relies on the intrinsic wavelength filtering property of a semiconductor is disclosed in U.S. Pat. No. 4,749,85, issued to R.F. Wolffenbuttel. This method is relatively complex and relies on specialized test equipment. However, its greatest disadvantage is that the method can introduce a significant degree of error in the determination of the color of incident light.

Another type of color sensor is one developed by the Nagoya Municipal Industrial Research Institute of Nagoya-shi, Japan. This sensor is based on an electrically controlled birefringence liquid crystal cell which is mounted on a p-n junction photodiode. The device indicates the color of an illuminating photon by the variation in the output current waveform of the transducer which occurs as the voltage across the liquid crystal cell is changed. The ability to electronically tune the spectral transmittance of the sensor also allows it to be used as a speotrometer. A disadvantage to this type of sensor is that the liquid crystal cell which it uses cannot be readily integrated onto the same integrated circuit chip as the photodiode.

Another topic of interest is one arising in the semiconductor industry, where the characterization of semiconductor materials is important during both basic research and device design and fabrication. The variation of the space charge width with reverse bias voltage, the dopant density, and the absorption coefficient are fundamental parameters of a semiconductor and help to determine its utility and potential range of applications.

The absorption coefficient is usually determined by comparing the intensity of incident light on a material to that transmitted through it. After corrections for the light which is reflected, the extent of light absorption can be determined, and from this the absorption coefficient can be inferred. The depletion width of a space charge region in a semiconductor can be determined by measuring the capacitance of the depletion region as a function of voltage for a sample of the material. This allows the sample's doping density to be determined, as it depends upon the depletion width. A disadvantage to both of these methods is that they require specialized instruments which can sometimes be expensive, and may not be readily available.

What is desired is a method for accurately determining the wavelength or color of light incident on a detector which is based on the use of a single detector and can be readily integrated into the standard fabrication processes used in the semiconductor industry. It is also desired to have a method for characterizing the properties of semiconductor materials which is simpler and requires less specialized instrumentation than the methods currently being used.

SUMMARY OF THE INVENTION

The present invention is directed to a method of using dc photocurrent measurements to sense the wavelength or color of incident light or to characterize certain properties of a semiconductor device or material. The method is based on measuring the dc photocurrent produced by a photodetector in response to incident light.

Because the absorption coefficient (i.e., the penetration depth) of the photodiode material is a function of wavelength, the material has an intrinsic wavelength filtering capability. This filtering ability is used as the basis for inferring the wavelength of the absorbed light by relating measurements of the dc photocurrent versus reverse bias voltage to the absorption coefficient. The value which is determined for the absorption coefficient is then used to determine the wavelength of the detected light.

Color detection is accomplished by expressing the measured photocurrent as a linear combination of the photocurrents due to detection of each of the three primary colors. The coefficients of each of the terms of the linear combination are then varied to obtain the best fit to the measured photocurrent. This allows a determination of the color of the detected light, based on the respective contributions of each of the primary colors to its actual color.

The relationship between the absorption coefficient and wavelength is also used to infer important characteristics of the semiconductor material from which the detector is fabricated. In this application of the method, monochromatic light of a known wavelength is used to illuminate the detector, and measurements of the photocurrent versus reverse bias voltage are used to infer the value of the material's absorption coefficient at the wavelength of the incident light. Measurements of the photocurrent versus reverse bias voltage for incident monochromatic light can also be used to infer the depletion width as a function of reverse bias voltage for the material, and from the depletion width the doping density of the material.

Further objects and advantages of the present invention will become apparent from the following detailed description and accompanying drawings.

DESCRIPTION OF THE PREFERRED EMBODIMENT

Figure 1:
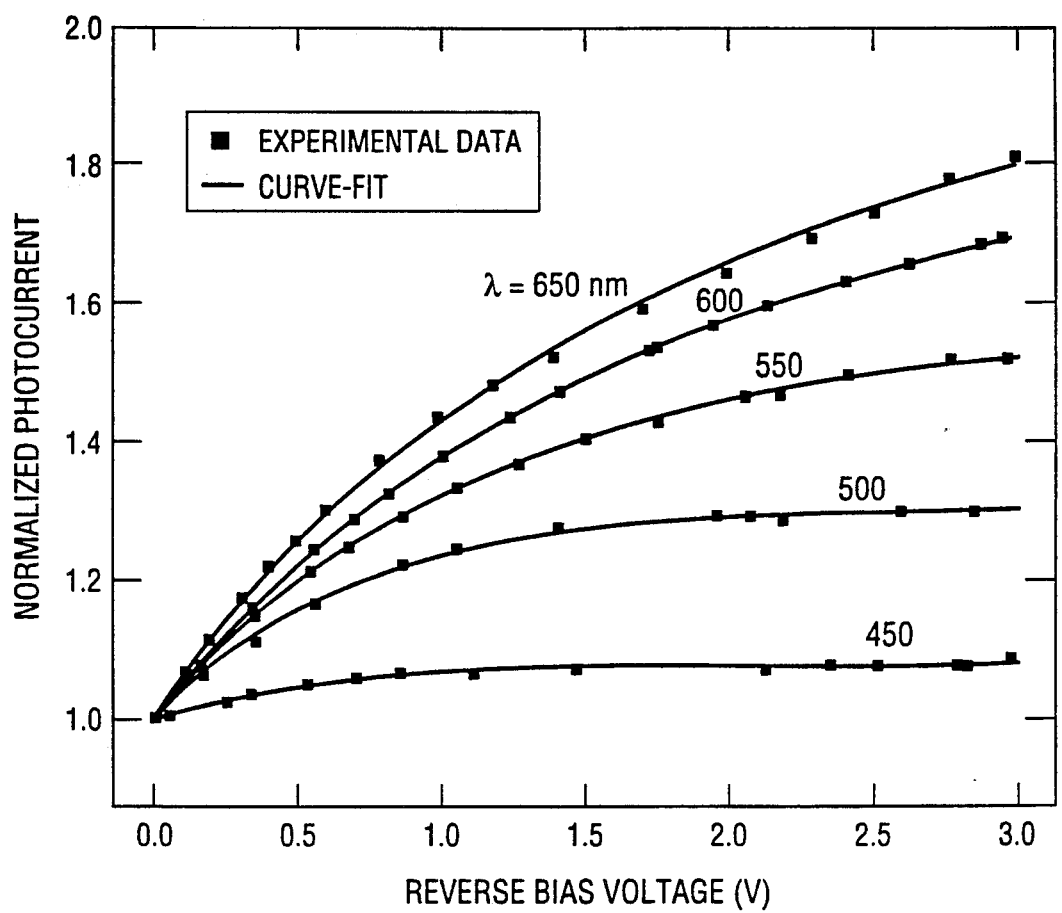
FIG. 1 shows graphs of the normalized photocurrent versus reverse bias voltage for the indicated wavelengths of incident light for an amorphous silicon Schottky photodiode.

The method of the present invention is applicable to two broad categories of use: a) wavelength and color sensing for spectrometry, and b) optical diagnostic techniques for characterizing semiconductor devices or materials. Although the following discussion is based on the theory of operation of a photodiode, in particular an amorphous silicon Schottky diode, the proposed techniques may be applied to a variety of different types of photodetectors.

Theory Behind the Application of the Method

The intensity of monochromatic radiation which is incident upon a photodiode varies with depth into the semiconductor material from which the device is fabricated. The decrease in intensity of incident radiation with propagation depth x is characterized by the absorption coefficient, and can be expressed as:

$$i = i_0 exp(-\alpha x), \tag{1}$$

where $i_0$ is the incident intensity and $\alpha$ is the absorption coefficient of the material. The absorption coefficient per unit length $\alpha$ is a function of wavelength $\lambda$, and can be expressed as:

where k is the complex part of the refractive index (n). Near the absorption edge of an energy bandgap the absorption coefficient has the form:

$$\begin{align} \alpha &\approx [(hc/\lambda) - E_g]^{1.5} \quad \text{for } (hc/\lambda) > E_g \\ &= 0 \quad \text{otherwise,} \end{align} \tag{3}$$

where h is Planck's constant, c is the speed of light, and Es is the energy of the bandgap between the valence and conduction bands of the semiconductor. The exponent of 1.5 arises for the case of forbidden direct transitions. Equation (3) represents the ideal form of the relationship between the absorption coefficient and the wavelength, and the actual dependence of one quantity on the other may vary depending on the semiconductor being considered. Due to the dependence of the absorption coefficient on wavelength, the intensity of shorter wavelength light is reduced more rapidly with depth of penetration into the material, i.e., it is predominantly absorbed closer to the surface of the silicon layer, compared to that of longer wavelength light.

The absorption of photons having an energy equal to or greater than the bandgap energy of the semiconductor material results in the generation of electron-hole pairs. In a reverse biased photodiode, the photocurrent resulting from the absorption of monochromatic light is expressed as:

$$I(V) = qA\eta\phi \left(1 - \frac{e^{-\alpha W}}{1 + \alpha L}\right), \tag{4}$$

where I is the photocurrent density, A is the effective device area, q is the charge of an electron, $\eta$ is the quantum efficiency, $\phi$ is the incident photon flux, $\alpha$ is the absorption coefficient, L is the diffusion length of the minority carriers, and W is the depletion width.

Equation (4) for the total photocurrent includes both drift and diffusion components. The drift component of the current arises due to photocarriers generated within the depletion region of the device, whereas the diffusion component is due to photocarriers created outside of this region which diffuse into it before recombining.

In amorphous silicon diodes, the diffusion component may be negligible compared to the drift current. This occurs if the density of defects in the semiconductor material is large, resulting in a large number of recombination centers. This produces a low value for the lifetime of the minority carriers and hence a small diffusion component. In addition, the disordered structure of amorphous silicon results in an increase in the scattering of carriers, leading to a low carrier mobility and small diffusion length.

Thus, by proper selection of the semiconductor material which is used as the basis for the photodetector, the diffusion component of the photocurrent can be made negligibly small (in some cases, completely eliminated) compared to that of the drift current. This result can also be accomplished by utilizing a judicious device design. Devices having a pnp or npn structure, wherein both junctions are reverse biased, is an example of one possible design. Here one of the junctions may be used to collect the desired drift component and the photocarriers generated outside this space charge region (the diffusion component) may be collected by the other junction.

Therefore, if it is assumed that $\alpha L << 1$ in equation (4), the photocurrent can be expressed as:

$$I(V) = qA\eta\phi[1 - (e^{\alpha w})], \tag{5}$$

which represents only the drift component of the photocurrent. The voltage dependence of the photocurrent arises from the dependence of the depletion width upon the reverse bias voltage and the generation rate of electron-hole pairs as a function of depth. For sufficiently large reverse bias voltages the depletion width is considerably greater than the penetration depth of light, i.e., $\alpha W >> 1$, and the photocurrent saturates to a value of $qA\eta\phi$. However, for relatively low voltages (where W is comparable to $1/\alpha$), the dc photocurrent strongly depends upon the absorption coefficient.

The above discussion points out two characteristics which a photodetector designed to be used in practicing the method of the present invention should have; 1) the product of the absorption coefficient and diffusion length should be such that $\alpha L << 1$ (although the method will work even if $\alpha L \leq 1$), and 2) the bandgap energy of the semiconductor material used in the detector should be such that a photon of the wavelength of light which is to be detected can be absorbed.

Since the penetration depth of blue light is considerably less than that of red (as the wavelength of blue light is smaller than that of red), the photocurrent for blue light saturates at a relatively lower reverse bias voltage. This is the feature which provides the material with its intrinsic wavelength filtering characteristic and is utilized in the wavelength and color detection method of the present invention.

The wavelength of an absorbed photon of incident light can be inferred from the absorption coefficient of the photodetector, as indicated by equation (3). Theoretically, if the variation of the depletion width with voltage is known, the value of the absorption coefficient for a particular wavelength could be determined from measurements of the photocurrent. Application of equation (3) would then allow the wavelength of the light to be determined. However, some of the terms in equation (5), i.e., the quantum efficiency of the detector and the intensity of the incident light, are not known a priori, and therefore, a straightforward photocurrent measurement does not yield the value of the absorption coefficient.

However, if the ratio $\Gamma$, which represents the ratio of the modulated to the dc photocurrent per unit volt is evaluated, where $\Gamma$ is defined as:

$$\Gamma = \frac{dI/dV}{I} = \frac{\alpha e^{-\alpha W}}{1 - e^{-\alpha W}} \frac{dW}{dV} \quad (6)$$

then the A, $\eta$, and $\phi$ terms are eliminated, and the result is an expression having only $\alpha$ as an unknown. Since $\alpha$ and the wavelength of the light are related for each semiconductor material, given the depletion width as a function of reverse bias voltage (and hence dW/dV), a measurement of $\Gamma$ and the subsequent determination of o allows one to determine the wavelength of the incident light.

Wavelength and Color Sensing

To determine the wavelength of monochromatic light incident on a photodetector, the quantity F defined in equation (6) is determined experimentally. This requires measuring the dc photocurrent produced by the detector versus the reverse bias voltage, I(V), differentiating this characteristic numerically to obtain dI/dV, and then finding the ratio $\Gamma$, which is a function of voltage. Such measurements can be carried out by means of standard test equipment, i.e., ammeters, voltmeters, and a variable power supply. If the depletion width W as a function of the reverse bias voltage is known, the absorption coefficient o may then be determined from the expression for F. The wavelength of the monochromatic incident light can then be determined from experimentally obtained data relating the absorption coefficient to the wavelength of incident light for the type of photodetector used to make the measurements. In some situations it may be possible to infer the wavelength from the expression relating the absorption coefficient to the wavelength of incident light.

To illustrate this technique for wavelength sensing, the inventor has applied the method of the present invention to the dc photocurrent data of an amorphous silicon Schottky diode which was published in the article "Amorphous silicon solar cells", by D.E. Carlson and C.R. Wronski, contained in the reference "Topics in Applied Physics, Amorphous Semiconductors", Springer-Verlag, New York, vol. 36, p. 287 (1985). The characteristics of the Ⓡdevice used to make the measurⒺmⒺnts WerⒺsuch &hat thⒺdrift component was the dominant contributor to the photocurrent. The data, which is presented as graphs of the normalized photocurrent versus reverse bias voltage for the indicated wavelengths of incident light, is shown in FIG. 1.

Figure 2:
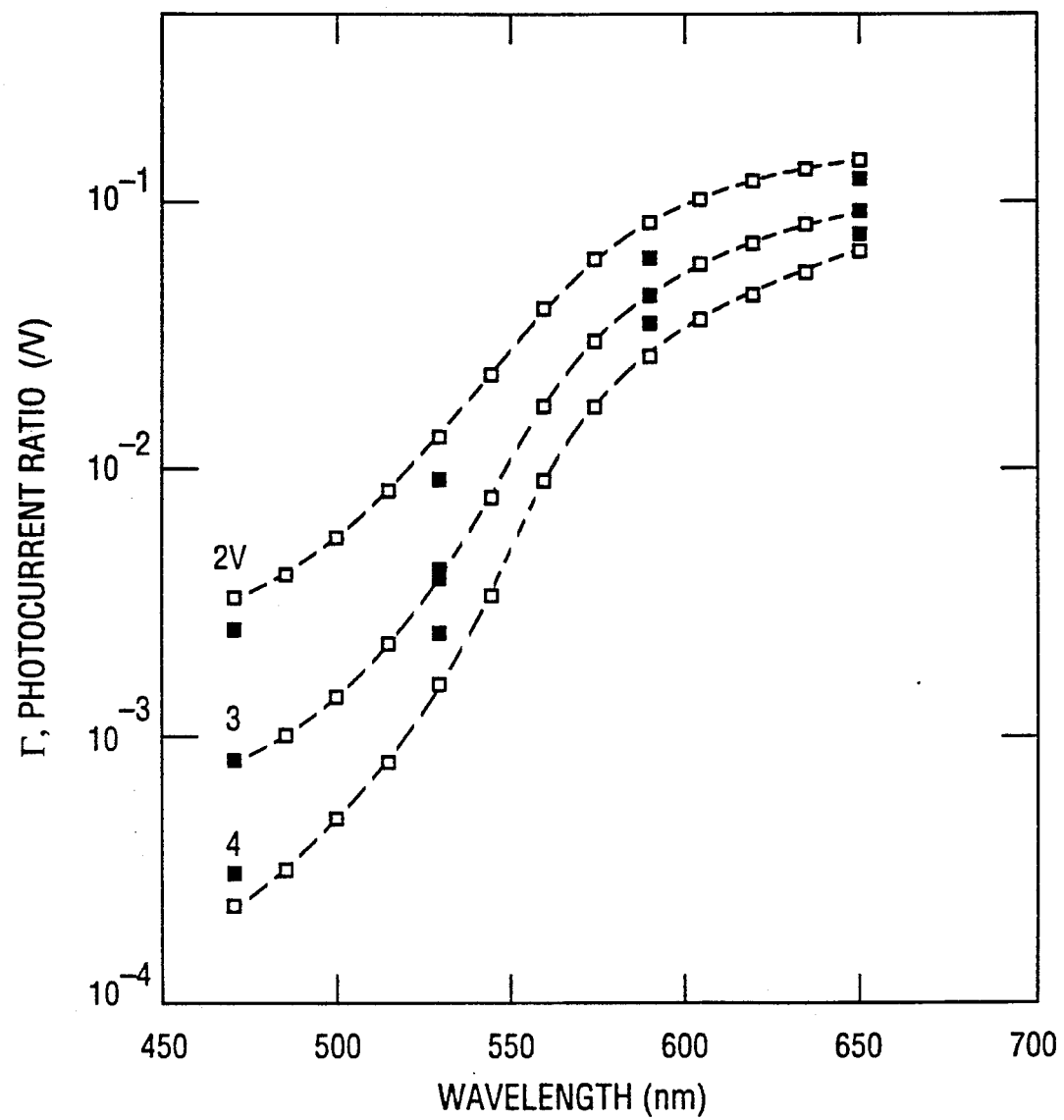
FIG. 2 shows the photocurrent ratio as a function of wavelength for three values of the reverse bias voltage, where the photocurrent ratio is based on the data of FIG. 1.

FIG. 2 shows the photocurrent ratio $\Gamma$ as a function of wavelength for three values of the reverse bias voltage, where the photocurrent ratio is based on the data of FIG. 1. The open and closed squares represent the theoretical and the experimental results, respectively. The dashed line connecting the open squares is drawn to illustrate the theoretical trend. As indicated by FIG. 2, the value of the ratio $\Gamma$ is unique for each wavelength. Moreover, the ratio (at 4 V) changes by more than two orders of magnitude in going from wavelengths of 470 to 650 nanometers, suggesting that the technique is quite sensitive to wavelength. This supports the idea that this method can provide an accurate and unambiguous method of determining the wavelength of incident light.

It is also possible to determine the wavelength of light incident on a photodetector without the use of depletion width versus voltage data. In this case, measurements of the photocurrent versus reverse bias voltage are made for a representative sample of incident light wavelengths. This data is used to construct a look-up table relating the photocurrent, reverse bias voltage, and wavelength. Measurements of photocurrent versus voltage can then be used with the table to determine the wavelength of incident light from a different source.

The method of the present invention can also be used to determine the color of polychromatic incident light. This scheme of detecting the color of incident light is based on defining a responsivity R(V) for the detector for each of the red, green, and blue primary colors, where R(V) is independent of the intensity of the incident light:

$$R_r(V) = [(q\eta_r)/E_{pr}][1 - e^{-\alpha_r W}], \quad (7a)$$

$$R_g(V) = [(q\eta_g)/E_{pg}][1 - e^{-\alpha_g W}], \quad (7c)$$

$$R_b(V) = [(q\eta_b)/E_{pb}][1 - e^{-\alpha_b W}], \quad (7c)$$

where q is the charge of an electron, $\eta$ is the quantum efficiency of the detector at the wavelength corresponding to the indicated primary color, $E_p$ is the energy of a photon of light of the indicated primary color, $\alpha$ is the absorption coefficient of the detector at the wavelength corresponding to the indicated primary color, and W is the depletion width of the detector at the voltage V.

The responsivity of the detector as a function of reverse bias voltage for each primary color can be determined experimentally. This is done by measuring the photocurrent produced by the detector for a range of reverse bias voltage values using incident monochromatic light of a known intensity which has a wavelength corresponding to that color. Thus by making a series of photocurrent versus reverse bias voltage measurements using monochromatic light which corresponds to each of the three primary colors, the responsivities defined in equations (7a), (7b), and (7c) may be determined.

The total photocurrent generated by the detector in response to incident light of an unknown color may be considered to be a linear combination of the photocurrent components corresponding to the three primary colors, and expressed as:

$$I(V) = i_r R_r(V) + i_g R_g(V) + i_b R_b(V), \quad (8)$$

where $i_r$, $i_g$, and $i_b$ are the optical power, and $R_r$, $R_g$ and $R_b$ are the responsivity (A/W) terms defined in equations (7a), (7b), and (7c) for the red, green and blue components of the incident light. The object is to measure the photocurrent produced by the detector at a range of reverse bias voltage values when it is illuminated by incident light of an unknown color, and then to determine the values of the coefficients $i_r$, $i_g$ and $i_b$ which provide the best fit to the experimentally obtained I(V) and R(V) data. This allows the color of the incident light to be inferred based on the relative contributions of each of the primary colors. The coefficients may be determined by curve-fitting the experimentally obtained photocurrent versus reverse bias data.

Figure 3:
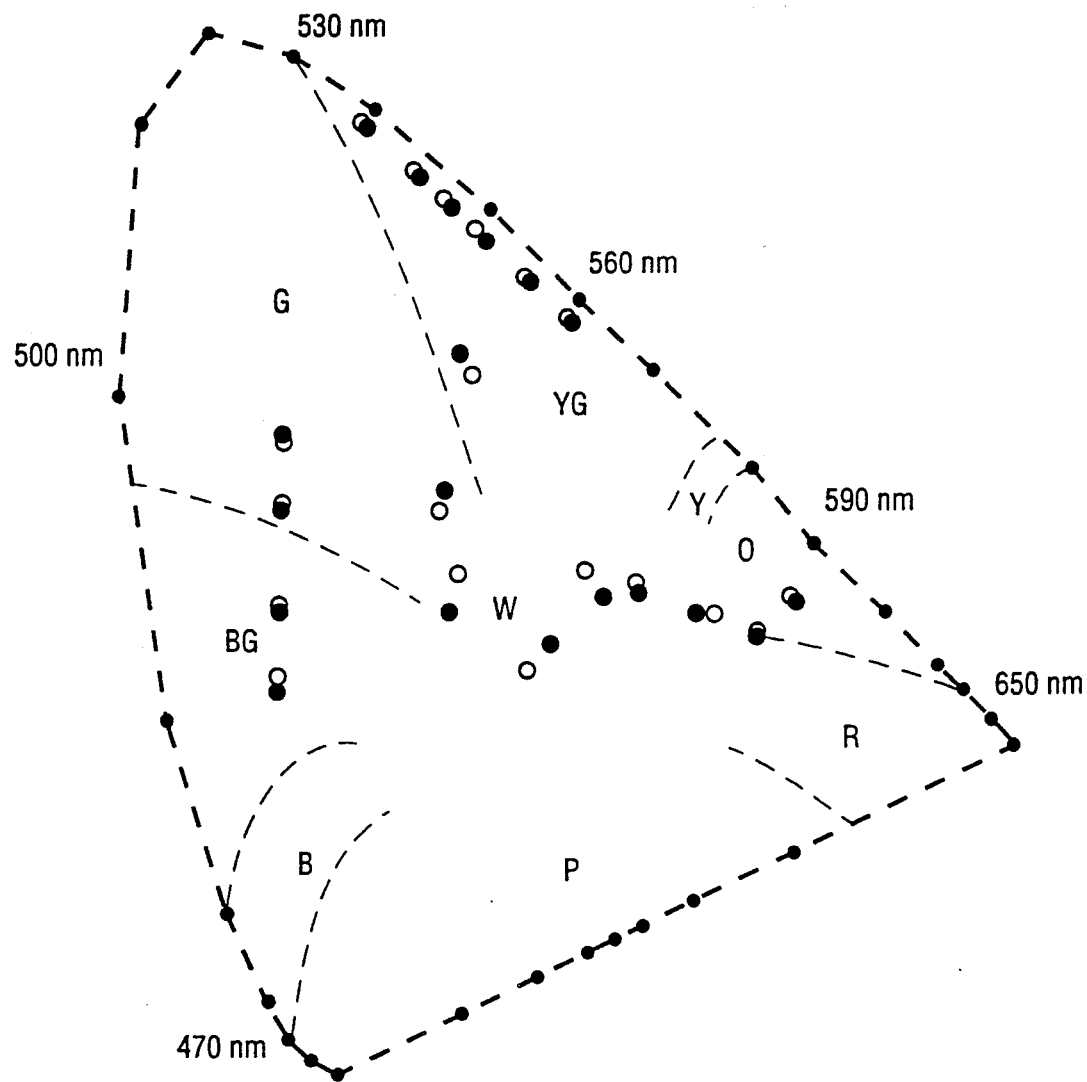
FIG. 3 is a color chart showing the relative contributions of each of the primary colors to the actual color of an incident light source, and to its color as determined by the method of the present invention.

The inventor has demonstrated the above technique using an amorphous silicon Schottky photodiode. A variety of colors were generated by mixing varying proportions of blue, green and red monochromatic lights. The curve-fitting was done using the Levenborg-Marquardt optimization algorithm (a variation of a standard least squares data fitting method), and the coefficients $i_r$, $i_g$ and $i_b$ were determined. Other curve-fitting methods may also be used to accomplish the same result. The results are plotted in FIG. 3, which is a color chart showing the relative contributions of the primary colors to the actual color of an incident light source and to its color as determined by the method of the present invention. The open and closed circles in the FIGURE represent respectively, the actual and estimated (based on the method of the present invention) color of the incident light. As can be seen, the estimated colors are in the same general region of the chart and in many cases are very close to the aotual colors.

The method of the present invention for determining the color of incident light is preferable to those based on the use of multiple detectors for at least two reasons. Firstly, it is simpler since it requires the use of only one detector. However, its greatest benefit, even when compared to other single detector methods, may be that it is more reliable and accurate. This is because it does not rely on the inversion of a spectral response matrix, and hence the method is not susceptible to problems which may result from the ill-conditioning of the matrix.

Characterization of semiconductor Materials

A variation of the above method for the determination of the wavelength or color of incident light may also be applied for purposes of characterizing certain properties of semiconductor materials. In the applications of the method discussed above, the wavelength of the incident light was the unknown parameter. However, if monochromatic light having a known wavelength is used, then the quantity $\Gamma$ from equation (6) provides a basis for determining the absorption coefficient of the material from which the photodetector is fabricated.

To determine the absorption coefficient as a function of wavelength, measurements again must be made of the dc photocurrent versus reverse bias voltage, I(V), followed by differentiating this characteristic numerically to obtain dI/dV. If the depletion width W as a function of the reverse bias voltage is known, the absorption coefficient 60 may be determined from the expression for $\Gamma$. Since the wavelength of the incident light is known, the absorption coefficient may be evaluated, providing a value for that quantity at the indicated wavelength, i.e., $\alpha = \alpha(\lambda)$ may be determined, where $\lambda$ is known.

Figure 4:
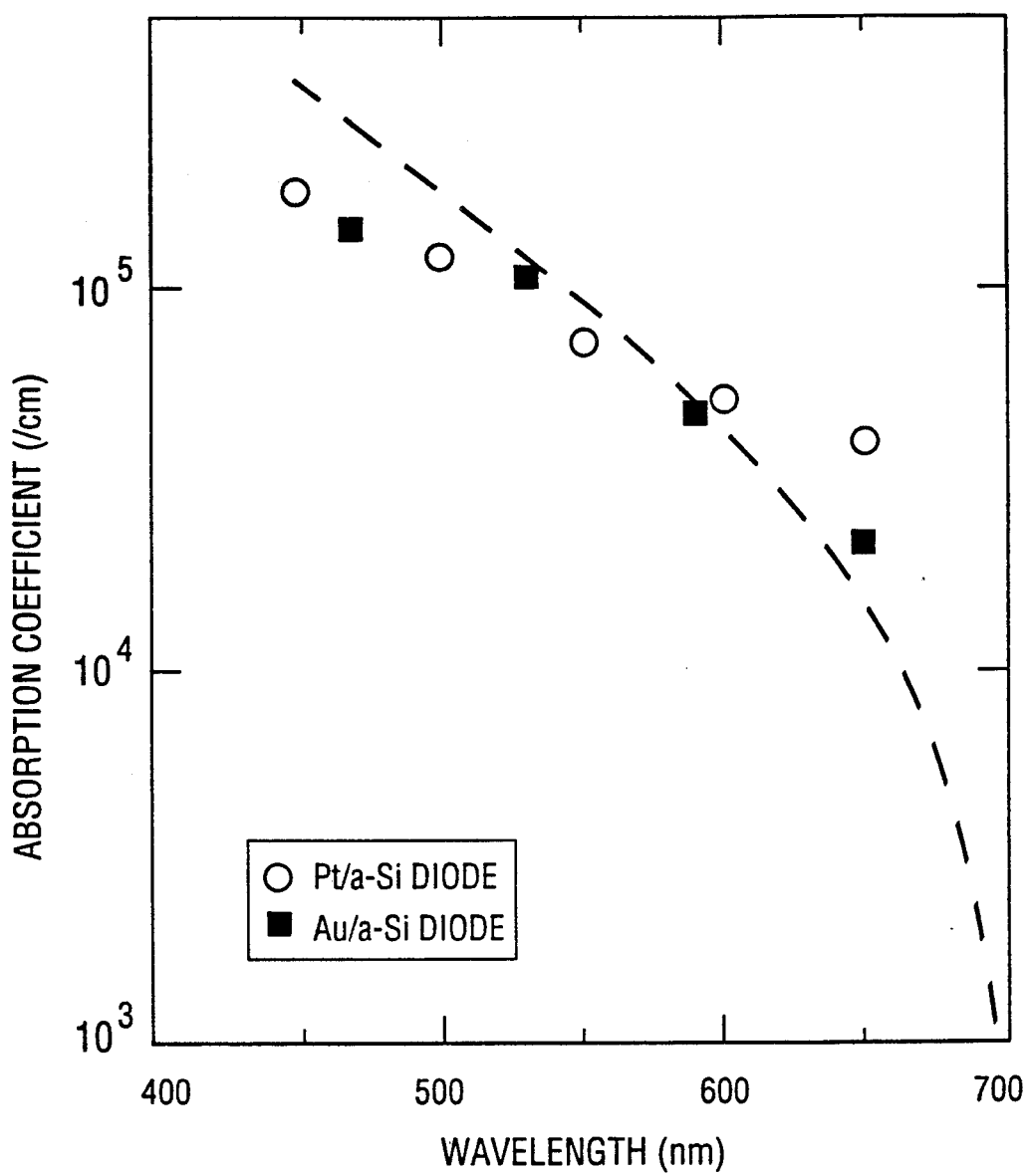
FIG. 4 is a graph showing the absorption coefficient as a function of wavelength for an amorphous silicon photodetector based on data obtained using the method of the present invention, and the results of absorption coefficient measurements reported in the literature.

FIG. 4 is a graph showing the absorption coefficient data for an amorphous silicon photodetector which was obtained using the method of the present invention, and the results of dc photocurrent measurements reported in the literature. The data points indicated by the open circles were estimated from the dc photocurrent data of a Pt/a-Si photodiode. The data points indicated by the solid squares are for a Au/a-Si photodiode and were obtained from dc photocurrent measurements made in accordance with the method of the present invention. The measurements were based on a photodiode which was fabricated by depositing a thin film of gold onto a silicon substrate. The dashed line is representative of values that have been reported in the literature. As can be seen by comparing the sets of data, the values of the absorption coefficient obtained from the dc photocurrent measurements are close to those expected and follow the general trend.

Alternately, the method of the present invention can be used to determine the depletion width W as a function of the reverse bias voltage by using monochromatic light and the value for the absorption coefficient which corresponds to that wavelength of light. To do this, equation (6) is rearranged to yield:

$$\frac{e^{-\alpha W}}{1 - e^{-\alpha W}} dW = \frac{\Gamma}{\alpha} dV \tag{9}$$

Integrating both sides of this equation and rearranging terms gives:

$$W(V) = \frac{1}{\alpha} \ln\left\{ 1 - (1 - e^{-\alpha W_1}) \exp\left[\int_{V_1}^{V} \Gamma\, dV\right]\right\} \tag{10}$$

where $W_1$ corresponds to the depletion voltage at voltage $V_1$. Equation (10) provides a relationship between the depletion width W and the reverse bias voltage V. Furthermore, by evaluating equation (10) for multiple values of the upper integration limit V based on the measured values for $\Gamma(V)$, one can determine the variation of the depletion width with reverse bias voltage over the specified operational range of reverse bias voltages for the detector.

Figure 5:
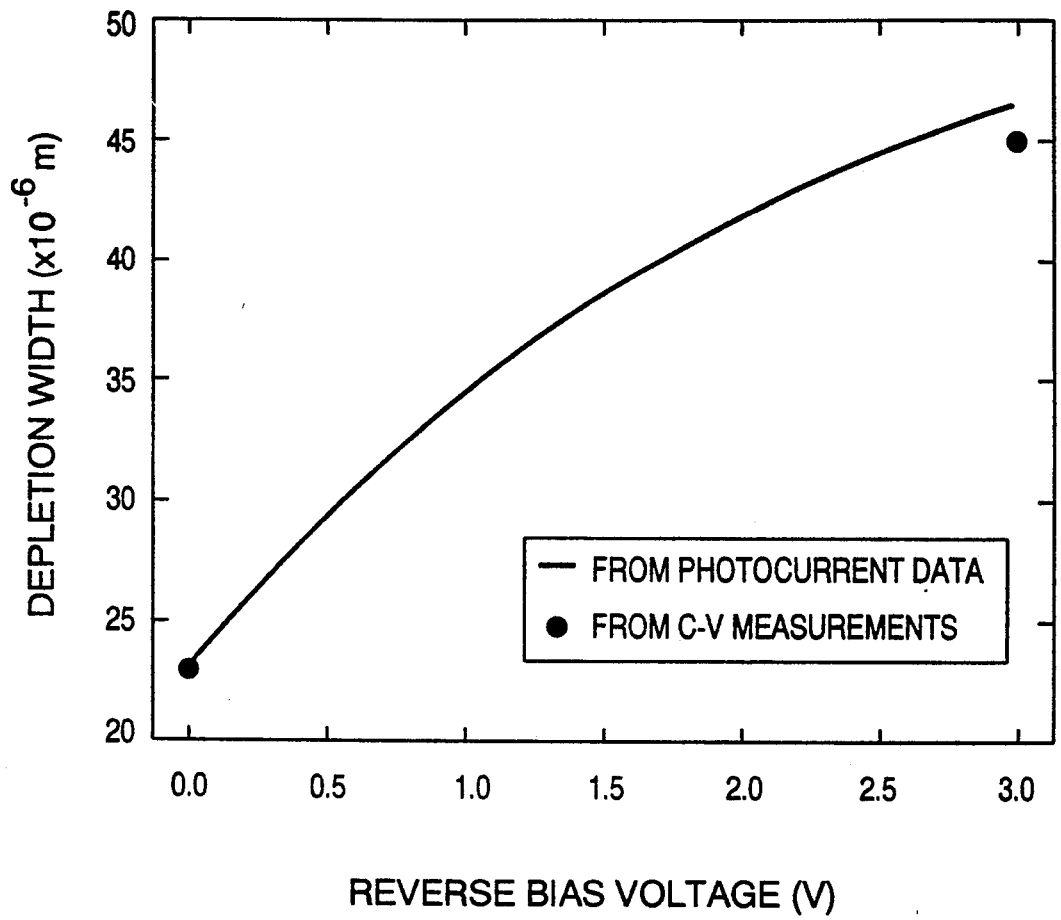
FIG. 5 is a graph showing the depletion width as a function of reverse bias voltage for a photodiode, indicating the results of both standard capacitance-voltage measurements and the method of the present invention.

The depletion width W versus reverse bias voltage V variation is plotted in FIG. 5, which is a graph showing the depletion width as a function of reverse bias voltage for a photodiode, based on measurements made using incident light having a wavelength of 650 nanometers. FIG. 5 indicates the results of both standard capacitance-voltage measurements and the method of the present invention, where the solid dots are data points obtained using standard measurements, and the solid curve is obtained using the proposed technique.

Although FIG. 5 indicates a good correspondence between results obtained from the method of the present invention and those obtained from standard capacitance measurements, this depends somewhat on the conditions under which the measurements are made. As the reverse bias voltage increases, the depletion width becomes larger. If the depletion width significantly exceeds the penetration depth for a photon of a given wavelength, such photons are completely absorbed within a shallower depth. This causes the photocurrent to be only loosely dependent on the depletion width. This means that the accuracy with which the present method can characterize the depletion width as a function of reverse bias voltage depends on the wavelength of light chosen for making the measurements.

In addition, the depletion width versus voltage values obtained by using the method of the present invention may permit the doping density of the semiconductor material from which the photodetector is fabricated to be determined. This is because the depletion width and doping density are related, as described by the following equation:

$$W = [2\epsilon^*(V_i + V)/(q^*N)]^{0.5} \text{ tm} \tag{11}$$

where $\epsilon$ is the dielectric constant of the material, $V_i$ is the built in voltage, V is the reverse bias voltage, q is the charge on an electron, and N is the doping density. In this case equation (11) is solved for N, so that values of W(V) can be used to determine the doping density (for situations where the doping density is uniform with depth).

The use of monochromatic light to characterize these fundamental parameters of semiconductors has not been reported before. The technique is simple because it only requires measurements of the dc photocurrents produced by a photodetector. The proposed technique is novel because it approaches the issues from a fundamental standpoint. It may also become the basis for the development of low-cost instruments for performing diagnostic evaluations of semiconductor materials and devices.

Another potential use of the method of the present invention is in the field of fiber optic communications. A current area of research in the communications industry is the use of wavelength-multiplexing in fiber optic networks. This entails the detection of multiple wavelengths at the receiving node. A separate photodetector could be used for each wavelength, however, using the present invention only one photodetector would be needed. This could produce considerable savings and provide an incentive to implement such ideas. In the event it was desired to use the method of the present invention for such a purpose, issues such as speed of operation, noise, etc. would still have to be addressed.

The method of the present invention provides a simple and economical method of detecting wavelength or color. Sensors can be fabricated using standard integrated circuit fabrication processes and can be based on a variety of materials. In addition, the equations on which the method are based allow the wavelength or color of the light to be determined with a higher resolution and precision than can be done using current detectors and methods. The sensors are amenable to the techniques used to miniaturize semiconductor devices and hence can be placed in hazardous areas or those which are difficult to access. The sensors also have the potential of being able to be fabricated on the same chip as their associated processing circuitry.

Although the sensing of visible light has been discussed, the method may also be extendable to imaging applications based on detecting infrared radiation. In this case detectors which produce a dc photocurrent after illumination by infrared radiation would be used. Further work is required in order to determine the accuracy of such a technique.

As far as characterizing semiconductor materials, the method of the present invention has the advantages of being simple and not requiring the often expensive test equipment that is currently used for such purposes. The dc photocurrent can be measured using ammeters and voltmeters which are readily available in most laboratories. When determining the absorption coefficient of a material, expensive optical equipment is not required. When determining the depletion width or doping density, the method does not require making capacitance measurements, again eliminating the need for additional instrumentation.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A method for determining a wavelength of light produced by a substantially monochromatic light source, the method comprising:

measuring a dc photocurrent produced by a photodetector operating at a reverse bias voltage for a plurality of values of the reverse bias voltage, the photodetector producing the photocurrent in response to its detection of incident light from the light source, wherein the magnitude of the photocurrent depends upon the reverse bias voltage and the wavelength of incident light, the photodetector having an absorption coefficient which is a function of the wavelength of the incident light, and a depletion width which is a function of the reverse bias voltage;

using the measurements of the dc photocurrent produced by the photodetector for a plurality of values of the reverse bias voltage and the knowledge of the depletion width as a function of reverse bias voltage to determine the value of the absorption coefficient corresponding to the wavelength of the incident light for the photodetector; and determining the wavelength of the incident light based on the value of the absorption coefficient.

2. The method of claim 1, also including the step of determining from measurements of the dc photocurrent as a function of reverse bias voltage the absorption coefficient by determining the quantity F, wherein $\Gamma$ is defined by $$\Gamma = \frac{dI/dV}{I}$$

where dI/dV is the derivative of the dc photocurrent as a function of the reverse bias voltage, and I is the dc photocurrent, and then relating F to the absorption coefficient based on the following relationship $$\Gamma = \frac{dI/dV}{I} = \frac{\alpha e^{-\alpha W}}{1 - e^{-\alpha W}} \frac{dW}{dV},$$

where $\alpha$ is the absorption coefficient of the photodetector, W is the depletion width of the photodetector, and dW/dV is the derivative of the depletion width as a function of the reverse bias voltage.

3. The method of claim 1, wherein the detector is an amorphous silicon photodiode.

4. A method for determining color of light produced by a visible light source, the method comprising:

determining responsivity as a function of reverse bias voltage for a photodetector for each of a plurality of primary colors, wherein the photodetector produces a dc photocurrent in response to the detection of light, the magnitude of the photocurrent depending upon the reverse bias voltage at which the photodetector is operating;

measuring the dc photocurrent as a function of reverse bias voltage for the photodetector at a plurality of reverse bias voltage values when the photodetector is illuminated by the light from the visible light source;

expressing the measured dc photocurrent as a linear combination, wherein each term of the linear combination is the product of a coefficient and the responsivity of the photodetector corresponding to each of the plurality of primary colors, the coefficients representing the contributions to the measured dc photocurrent from each of the primary colors;

determining best fit values for each of the coefficients of the linear combination which provide a best fit to the measured values for the dc photocurrent as a function of reverse bias voltage; and determining the color of the light based on the best fit values of the coefficients.

5. The method of claim 4, wherein the responsivity R(V) of the photodetector as a function of reverse bias voltage for a given primary color c is determined by measuring the current per unit of power produced by the photodetector as a function of reverse bias voltage when the photodetector is illuminated by substantially monochromatic light having a wavelength corresponding to the color c, and then determining R(V) from the relation $$R_c(V) = [(q\eta c)/E_{pc}][1 - (e^{-\alpha_c W})],$$

where q is the charge of an electron, $\eta_c$ is the quantum efficiency of the photodetector at the wavelength corresponding to the primary color c, $E_{pc}$ is the energy of a photon of light of the indicated primary color c, $\alpha_c$ is the absorption coefficient of the detector at the wavelength of light corresponding to the primary color, and W is the depletion width of the photodetector at the reverse bias voltage V.

6. The method of claim 4, wherein the detector is an amorphous silicon photodiode.

7. The method of claim 4, wherein the plurality of primary colors are red, green, and blue.

8. A method of determining an absorption coefficient for a particular wavelength of incident light for a semiconductor material, wherein the material is fabricated into a photodetector which operates at a reverse bias voltage, the photodetector producing a dc photocurrent in response to the detection of incident light, the magnitude of the photocurrent depending upon the reverse bias voltage and the wavelength of incident light, the semiconductor material having an absorption coefficient which is a function of the wavelength of the incident light, and a depletion width which is a function of the reverse bias voltage, the method comprising:

illuminating the photodetector with substantially monochromatic light of a known wavelength;

measuring the dc photocurrent produced by the photodetector for a plurality of reverse bias voltage values; and using the measurements of the dc photocurrent as a function of the reverse bias voltage and knowledge of the depletion width as a function of reverse bias voltage to determine the value of the absorption coefficient corresponding to the wavelength of the light.

9. The method of claim 8, also including the step of determining from measurements of the dc photocurrent as a function of reverse bias voltage the absorption coefficient by determining the quantity $\Gamma$, wherein $\Gamma$ is defined by $$\Gamma = \frac{dI/dV}{I}$$

where dI/dV is the derivative of the dc photocurrent as a function of the reverse bias voltage, and I is the dc photocurrent, and then relating $\Gamma$ to the absorption coefficient based on the following relationship $$\Gamma = \frac{dI/dV}{I} = \frac{\alpha e^{-\alpha W}}{1 - e^{-\alpha W}} \frac{dW}{dV},$$

where $\alpha$ is the absorption coefficient of the semiconductor material, W is the depletion width of the semiconductor material, and dW/dV is the derivative of the depletion width as a function of the reverse bias voltage.

10. A method of determining a value of a depletion width for a semiconductor material which is fabricated into a photodetector, the photodetector operating at a reverse bias voltage and producing a dc photocurrent in response to the detection of incident light, the magnitude of the photocurrent depending upon the reverse bias voltage, the semiconductor material having an absorption coefficient which is a function of the wavelength of the light, and a depletion width which is a function of the reverse bias voltage, the method comprising:

measuring the dc photocurrent as a function of reverse bias voltage for the photodetector at a plurality of reverse bias voltage values when the photodetector is illuminated by substantially monochromatic light;

evaluating the quantity $\Gamma$ as a function of the reverse bias voltage, V, for the wavelength of the light based on the photocurrent measurements, wherein $\Gamma$ is defined by $$\Gamma = \frac{dI/dV}{I}$$

where dI/dV is the derivative of the dc photocurrent as a function of the reverse bias voltage, and I is the dc photocurrent; and determining the depletion width based on the quantity $\Gamma$.

11. The method of claim 10, wherein the depletion width W as a function of the reverse bias voltage V is determined from the quantity $\Gamma$ by evaluating W, wherein W is defined by $$W(V) = \frac{1}{\alpha} \ln \left\{ 1 - (1 - e^{-\alpha W_1}) \exp \left[ \int_{V_1}^{V} \Gamma \, dV \right] \right\}$$

where $\alpha$ is the absorption coefficient of the semiconductor material corresponding to the wavelength of the light, and $W_1$ corresponds to the depletion width at voltage $V_1$.

12. The method of claim 10, further comprising:

determining the doping density of the semiconductor material based on the depletion width, wherein the doping density is defined by $$W = [2\epsilon^*(V)/(q^*N)]^{0.5}$$

where W is the depletion width corresponding to the reverse bias voltage V, e is the dielectric constant of the material, $V_1$ is the built in voltage, q is the charge of an electron, and N is the doping density.

13. A method for determining a wavelength of substantially monochromatic light, comprising:

measuring a dc photocurrent produced by a photodetector operating at a reverse bias voltage for a plurality of values of the reverse bias voltage and for a plurality of known wavelengths of incident light, the photodetector producing the photocurrent in response to its detection of incident light, wherein the magnitude of the photocurrent depends upon the reverse bias voltage and the wavelength of incident light;

generating a first set of dc photocurrent measurements by measuring a dc photocurrent produced by a photodetector operating at a reverse bias voltage for a plurality of values of the reverse bias voltage for substantially monochromatic incident light of an unknown wavelength; and processing the first set of dc photocurrent measurements to determine the unknown wavelength.

* * * * *